(12) United States Patent
Fay, II et al.

(10) Patent No.: US 9,717,175 B2
(45) Date of Patent: Aug. 1, 2017

(54) ROCK GUARD FOR QUICK CHANGE KNIVES ON A DISC MOWER

(71) Applicant: CNH INDUSTRIAL AMERICA, LLC, New Holland, PA (US)

(72) Inventors: Jeffrey Fay, II, Lititz, PA (US); Melanie W. Harkcom, New Holland, PA (US); Cecil R. Sudbrack, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 514 days.

(21) Appl. No.: 14/264,701

(22) Filed: Apr. 29, 2014

(65) Prior Publication Data
US 2015/0305236 A1    Oct. 29, 2015

(51) Int. Cl.
*A01D 34/52* (2006.01)
*A01D 34/66* (2006.01)

(52) U.S. Cl.
CPC ......... *A01D 34/665* (2013.01); *A01D 34/664* (2013.01)

(58) Field of Classification Search
CPC .................................................. A01D 34/664
USPC ..... 56/13.6, 255, 256, 17.4, 320.1, DIG. 20, 56/DIG. 24
See application file for complete search history.

(56) References Cited

U.S. PATENT DOCUMENTS

| | | | |
|---|---|---|---|
| 3,513,648 A * | 5/1970 | Kline et al. | 56/13.6 |
| 4,385,484 A | 5/1983 | Ehrhart et al. | |
| 4,815,262 A * | 3/1989 | Koch et al. | 56/13.6 |
| 5,012,635 A * | 5/1991 | Walters et al. | 56/13.6 |
| 5,890,757 A * | 4/1999 | Masterson et al. | 296/100.02 |
| 7,536,846 B1 * | 5/2009 | Pruitt et al. | 56/13.6 |
| 7,647,758 B1 | 1/2010 | Bandi et al. | |
| 7,730,703 B1 * | 6/2010 | Ehrhart et al. | 56/13.6 |
| 8,020,363 B1 * | 9/2011 | Barnett et al. | 56/17.4 |
| 2009/0158699 A1 * | 6/2009 | Pruitt et al. | 56/6 |
| 2011/0078988 A1 * | 4/2011 | Roberge | 56/13.6 |

FOREIGN PATENT DOCUMENTS

| | | |
|---|---|---|
| DE | 102012005544 A1 | 9/2013 |
| FR | 2630289 A1 | 10/1989 |
| GB | 2001836 A | 2/1979 |

* cited by examiner

*Primary Examiner* — Robert Pezzuto
*Assistant Examiner* — Mai Nguyen
(74) *Attorney, Agent, or Firm* — Patrick M. Sheldrake

(57) ABSTRACT

A rock guard for use on a rotary disc cutterbar having quick-release knife connectors wherein a knife removal relief channel is oriented 45 degrees from a straight-ahead orientation to allow more than one quarter of the knives on the cutterbar to be simultaneously aligned with the channels for removal. A second knife removal channel is also oriented 45 degrees from the straight ahead orientation and 90 degrees from the first channel to permit half of the knives on the cutterbar to be simultaneously aligned with the channels for removal. The incorporation of two knife removal channels as described benefits rotary cutterbars having two knives per rotary cutter and adjacent cutters rotationally offset by 90 degrees regardless of whether co-rotating or counter-rotating rotary cutters are employed.

8 Claims, 4 Drawing Sheets

ROCK GUARD FOR QUICK CHANGE KNIVES ON A DISC MOWER

BACKGROUND OF THE INVENTION

This invention relates generally to machines for severing standing crops from the ground using a cutterbar having a plurality of rotatable discs having knives mounted thereon to sever standing crop by an impact action upon rotation of the discs and, more particularly, to an improved rock guard for the rotatable discs that streamlines removal and replacement of knives on the cutterbar.

Rotary disc cutterbars are well known in the agricultural arts and used in the harvest of a variety of standing crops. A typical disc cutterbar comprises a plurality of cutterheads spaced along the length of the cutterbar. The cutterheads each typically comprise a rotating cutting disc including diametrically opposed cutting blades (though configurations with three or more blades are known) driven by a drivetrain housed within the cutterbar that receives motive power from the prime mover to which the disc mower is attached. The knife alignment on adjacent cutterheads is typically rotated 90 degrees to provide for cutting overlap without the risk of knives on adjacent cutterheads coming into contact. For background information on the structure and operation of some typical disc cutterbars, reference is made to U.S. Pat. No. 5,996,323, issued to Campbell, the descriptive portions thereof being incorporated herein in full by reference.

Cutterbars frequently impact rocks and other obstructions in a field which can damage the knives. Further, knives also become dulled by their interaction with the crop and require periodic removal for sharpening or replacement. This has led to the development of various quick-change knife systems which reduce the time necessary to change the knives on a cutterbar.

Rock guards are provided on the underside of rotary cutterheads to protect the rotating cutterheads and knives from impact with rocks and other obstructions as the cutterbar is moved across the ground. With the emergence of quick-change knives, rock guards have been modified to permit knife removal without requiring removal of the rock guards, typically by incorporating a single recessed area forwardly disposed in the rock guard which permits blade removal. The configuration of most rotary cutterbars requires that the rotary cutters be realigned, typically four times in order to replace all of the knives on the cutterbar.

It would be advantageous to provide an improved rock guard for use on rotary cutterbars with quick-change knives that would reduce the number of rotary cutter realignments necessary for a complete knife change on the cutterbar. Additional advantages would be realized by an improved rock guard that retained the same basic design as current rock guards allowing easy retrofit on existing cutterbars. Still further advantages would be realized by an improved rock guard for a rotary cutterbar having a quick-change knife attachment system that permits the same tool-free knife changes while maintaining a full cross-section on the leading edge of the rock guard to maximize the wear surface.

SUMMARY OF THE INVENTION

Accordingly, the present invention, in any of the embodiments described herein, may provide one or more of the following advantages:

It is an object of the present invention to provide an improved rock guard for a rotary disc cutterhead having quick change knives that provides multiple access channels arranged to align at least one knife from each cutterhead on the cutterbar to be removed without repositioning the cutterheads. On a cutterbar in which the knives on adjacent cutterheads are rotationally offset by 90 degrees, providing a rock guard with a pair of access channels oriented 90 degrees apart enables a knife from every cutterhead to be removed without rotating the cutterheads. When half of the knives have been removed or replaced, rotating the cutterbar by 90 degrees brings the remaining half of the knives into alignment with the access channels and allows the operator to complete the knife swap. Providing operator access to both access channels requires that the access channels be oriented 45 degrees from straight ahead.

It is a further object of the present invention to provide an improved rock guard for rotary disc cutterhead that incorporates the same basic design as the rock guard which it replaces while improving work efficiency for cutterbar knife changes. The improved rock guards incorporate mounting details compatible with existing cutterbar designs to permit interchangeability. A pair of perpendicularly arranged access channels are provided in the rock guard, each configured to allow tools needed to remove the knives access to the knife connections. The access channels are centered about a straight-ahead axis so that both access channels can be accessed from the front of the cutterbar.

It is a still further object of the present invention to provide an improved rock guard for an agricultural rotary disc cutterbar featuring quick-change knife connectors that is durable in construction, inexpensive of manufacture, carefree of maintenance, easily assembled, and simple and effective to use.

These and other objects are achieved in accordance with the instant invention by providing a quick-release knife connector for use on a rotary disc cutterhead having a shaped knife nut with a first portion providing a bearing surface for an aperture in the knife and a second portion which inhibits axial movement of the knife from contact with the first portion. The second portion is asymmetrically oriented. A capture element including an aperture for partially receiving the second portion is configured so that the asymmetrical second portion will only be received when the connector is properly oriented on the cutterhead.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
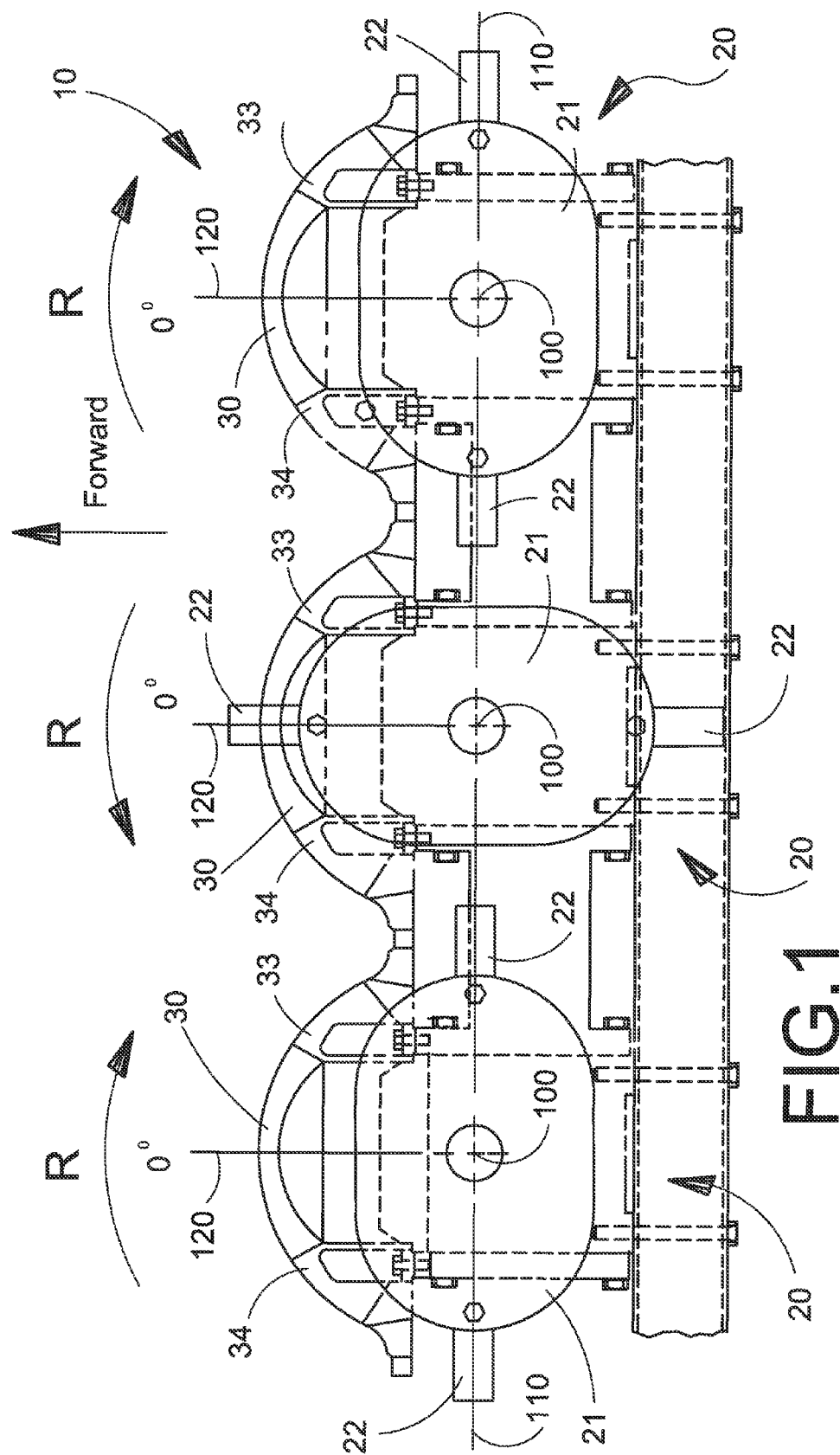
FIG. 1 is a partial plan view of an agricultural rotary disc cutterbar configured with quick change knives on which the present invention is useful.
Figure 2:
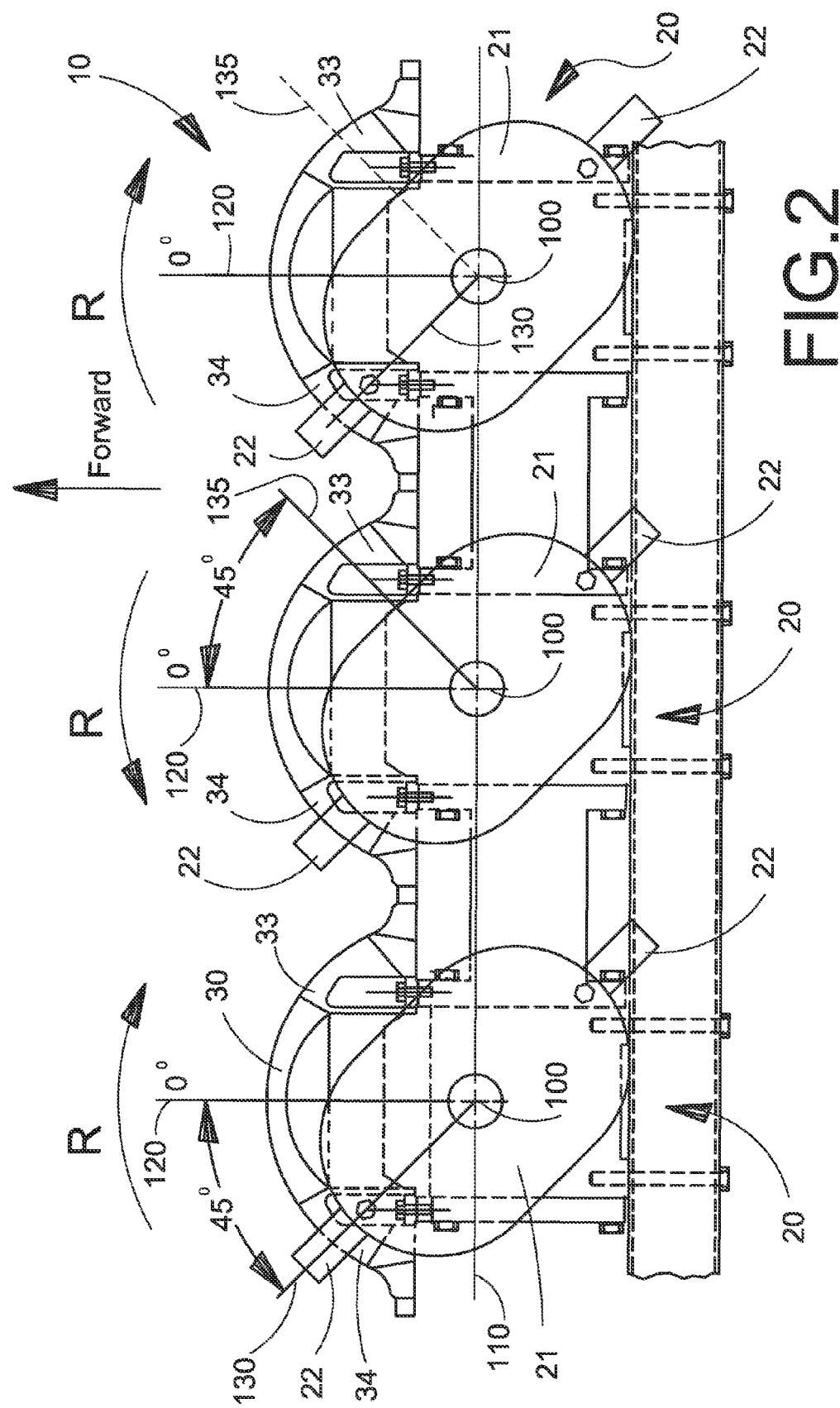
FIG. 2 is a view of the rotary disc cutterbar shown in FIG. 1, wherein the rotary disc cutterheads have been rotated 45 degrees from the position shown in FIG. 1

Referring now to the figures and particularly to FIGS. 1 and 2, where there is shown a portion of a rotary disc cutterbar 10 of the type commonly employed on agricultural harvesting machines for severing a standing crop while being propelled in a forward direction along a travel axis 120. The disc cutterbar 10 comprises a plurality of transversely spaced rotary disc cutterheads 20 generally spanning the width of the machine along a transverse axis 110 to define a cutting swath. Each rotary disc cutterhead 20 comprises a rotating disc element 21 driven for synchronized rotation (rotation direction arrows "R") about a generally upstanding rotational axis 100 by a gear train, and a plurality of knives 22 attached to the periphery of each rotating disc element for rotation therewith. For background information on the structure and operation of disc cutterbars, reference is made to U.S. Pat. No. 4,815,262, issued to Koch et al. and to U.S. Pat. No. 5,996,323, issued to Campbell et al., the descriptive portions thereof being incorporated herein in full by reference.

It is common practice to provide rock guards 30 disposed below the disc cutterheads 20 to protect the rotating disc elements 21 and knives 22 from direct contact with the ground. Rock guards are typically tapered from a leading edge at the forward-most portion to a vertically thicker portion at the rearward end where the rock guard is attached to the cutterbar frame. The rock guards 30 are typically robustly constructed to withstand contact with the ground and positioned slightly spaced apart from and below a plane created by the rotating knives 22 in order to protect the rotating knives. The rock guards are conveniently removable from the cutterbar 20 to provide access for maintenance of the cutterheads and drive or replacement of damaged rock guards.

Figure 5:
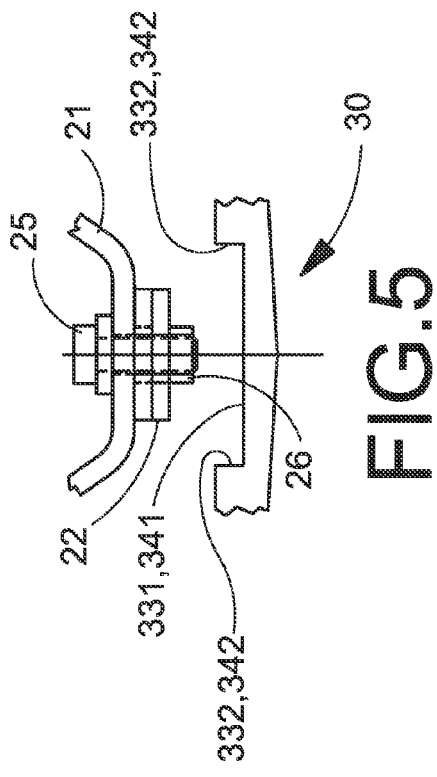
FIG. 5 is an end view of the rotary cutter and rock guard of FIG. 3 shown with a knife installed in an operating position.
Figure 6:
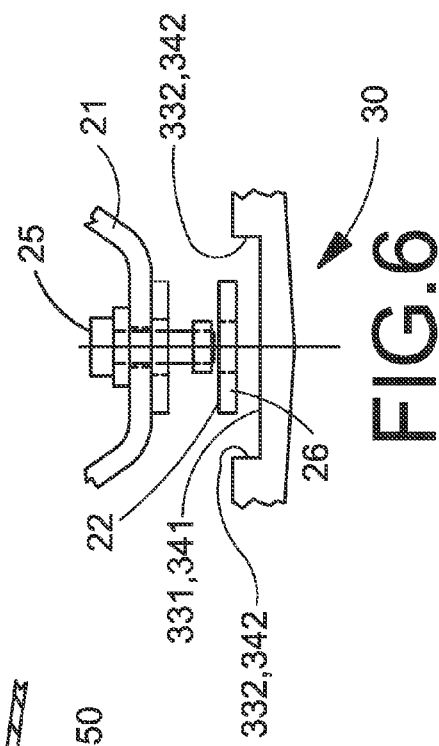
FIG. 6 is an end view of the rotary cutter and rock guard of FIG. 3 illustrating the knife being removed.
Figure 4:
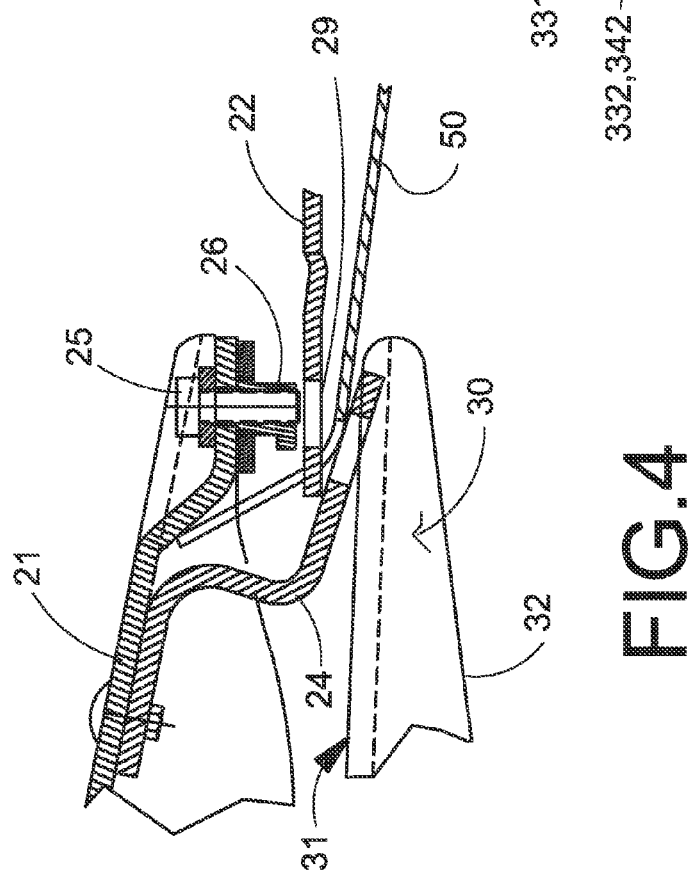
FIG. 4 is an elevation view of a single rotary cutter and rock guard from the cutterbar shown in FIG. 1.

Referring to FIGS. 4 through 6, one embodiment of a quick change knife connection is shown wherein each knife 22 is connected to the rotating disc element 21 by a mounting lug, typically comprising a knife nut 26 connected by a bolt 25 to a hole in the rotating disc element 21 adjacent to its periphery. An aperture 29 in each knife 22 is configured to be fitted over the lug axially (movement in a direction generally parallel to the rotational axis 100) to a position at which the knife will be restrained by the lug. A spring keeper 24 may be provided to prevent inadvertent release of the knife during machine operation. Removing the knife 22 requires flexing the spring keeper 24 downwardly away from the disc element 21 so that the knife 22 can then be moved axially downwardly and beyond the distal end of the knife nut 26 and then be pulled in a radial direction to remove the knife from the cutterbar.

As best illustrated in FIG. 1, it is conventional practice to rotationally offset adjacent cutterheads by approximately 90 degrees to allow a slight overlap in the cutting swath of each cutterhead without risking impact of adjacent knives. Adjacent cutterheads may be configured to counter-rotate or co-rotate, typically dependent upon the position of the individual cutterhead on the cutterbar. A counter-rotating arrangement is shown in FIG. 2, where is can be seen that, at least for the configuration of cutterheads having a pair of opposing knives mounted thereon, that the knives will move to the same relative orientation as the cutterheads are moved 45 degrees from the orientation shown in FIG. 1.

As the upper surface of the rock guard 30 is typically positioned as close as practical to the rotating plane of the knives 22, removal of the knives by any downward movement requires either removal of the rock guard or the provision of relief areas in the upper surface of the rock guard to provide adequate clearance for knife removal. Previously known rock guards provided a small channel positioned in the straight-ahead position (centered on the 0 degree forward travel axis 120 on FIGS. 1 & 2) to maximize working space while removing the knives. As can be seen in FIG. 1, such positioning necessitates several movements of the cutterbar in order to access all of the knives on the cutterbar as only one-quarter of the knives will be accessible in a given rotational position of the rotary cutterheads. Further, a straight-ahead oriented relief channel required increasing the depth of the leading edge of the rock guard which led to increased incidence of the rock guards digging into the ground.

The present invention improves upon known rock guards by incorporating a pair of access channels 33, 34 oriented 45 degrees on either side from the straight-ahead orientation. As can be seen in FIG. 2, one half of the knives 22 in a counter-rotating cutterbar will align along first radial axes 130 at 45 degrees displaced from the forward axis 120. By positioning at least one access channel (34 as shown) at a 45 degree orientation, it is possible to access half of the knives on the cutterbar from a single positioning of the cutterheads. The addition of a second access channel 33 along second radial axis 135 provides flexibility in positioning by providing a second orientation at which knives may be removed. The second access channel also reduces the necessary cutterhead rotation necessary to align the remaining half of the knives with an access channel to 90 degrees. This flexibility is beneficial for the outboard cutterheads where access may be restricted by the adjacent side shields typically present on a mower.

It is also known for some cutterbars to include a mix of co-rotating and counter-rotating cutterheads, such as the use of two or three co-rotating cutterheads positioned on the outboard ends of the cutterbar and configured to converge the cut crop toward the center of the cutterbar to improve feeding to a centrally disposed crop exit or conditioning apparatus. The two access channels 33, 34 of the present invention benefits this cutterbar arrangement as an adjacent co-rotating knife will be positioned 90 degrees offset, and align with the opposite relief channel compared to the knife of an instant cutterhead. By providing two access channels on each rock guard, one half of the knives on a cutterbar using 90 degree offset cutters and two knives per cutterhead may be simultaneously aligned with an access channel for removal.

Figure 3:
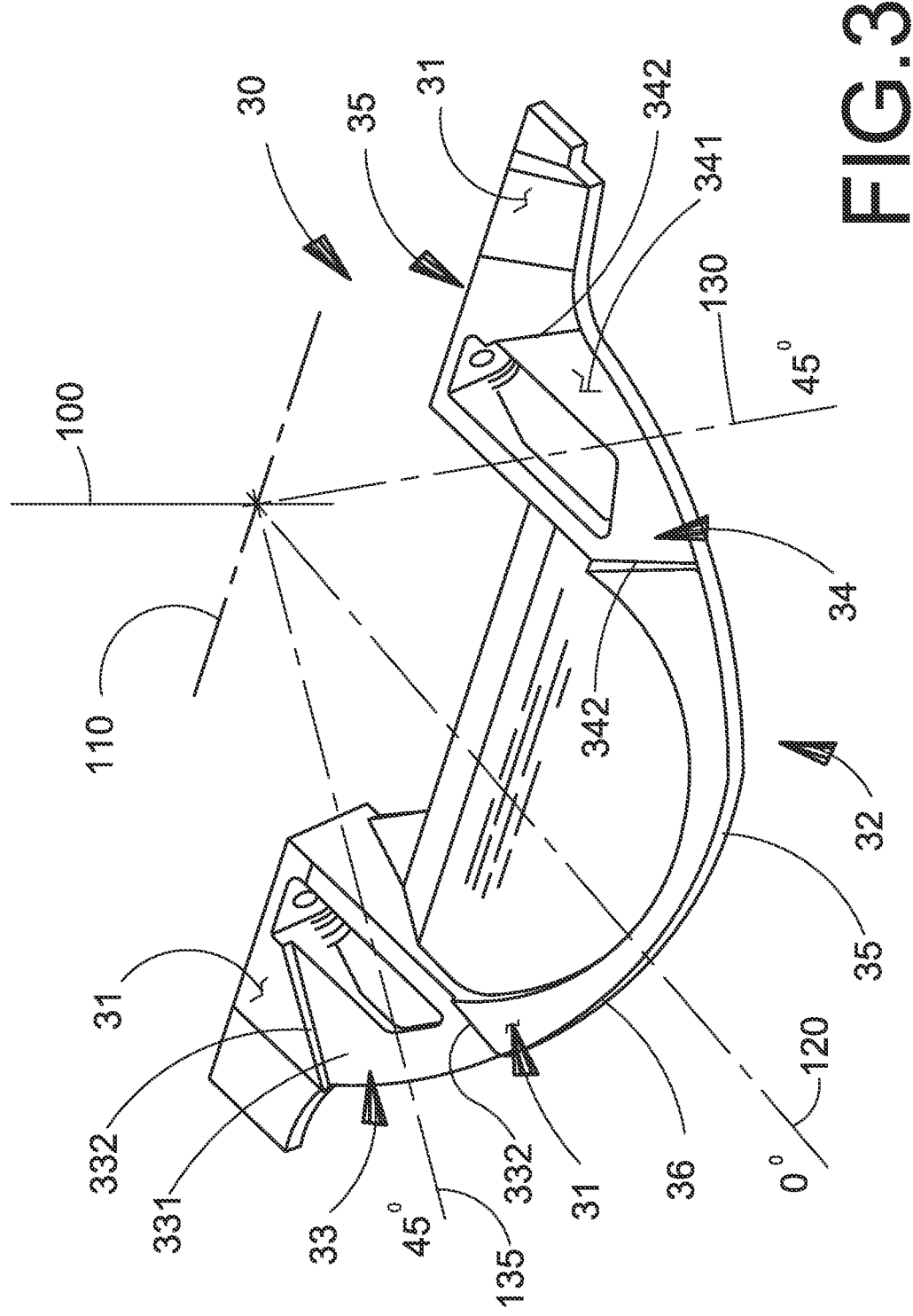
FIG. 3 is a perspective view of a rock guard featuring one embodiment of the present invention.

Referring to FIG. 3, the rock guard 30 is detailed. The rock guard comprises an upper surface 31 and a lower surface 32 intersecting with and rearwardly bounded by a mounting surface 35. The forward ends of the upper and lower surfaces meet to define a leading edge 36 which is shaped to generally match the rotating radius of the cutterhead rotating disc element 21. The upper surface 31 which is disposed adjacent to the rotating disc element includes at least one and preferably first and second relief channels 33, 34. The first relief channel 33 is positioned along an axis 45 degrees clockwise from the straight ahead (0 degrees) direction. The channel 33 is bounded by side walls 332 having a width generally greater than the width of a knife 22 so that exact rotational positioning of the knife is not required in order to remove the knife from the cutterhead rotating element 21. For cutterhead having a spring keeper 24, the width of the access channel must be sufficient to allow the spring keeper to fit between the side walls and the depth sufficient to allow the spring keep to be deflected to a position at which the knife can be disengaged from the knife nut 26. The depth of the access channels, defined by the position of channel floor 331, 341, is sufficient to provide clearance for knife removal, approximately 5 millimeters below the upper surface 31 in the preferred embodiment. Relocating the access channels from the forward or leading edge of the rock guard also enables the depth of the forward edge of the rock guard to be reduced thereby lessening the tendency of the rock guard to dig into the ground when the cutterbar is grounded. The area in which the relief channels 33, 34 are positioned in the present invention is in a portion of the rock guard that had greater vertical depth owing to the proximity of the relief channels to the rearward portion of the rock guard where it connects to the cutterbar.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A rock guard for a transverse rotary disc cutterbar used on an agricultural harvester for crop cutting while propelled in a forward direction comprising:
   a plurality of transversely spaced apart rotating discs geared for simultaneous rotation about generally upstanding axes, each disc having a pair of knives removeably attached by a connector in diametric opposition on the disc for rotation therewith, the pairs of knives on adjacent discs being rotationally offset by 90 degrees; and
   a rock guard disposed adjacently beneath the rotating knives of each of the plurality of discs, the rock guard having an upper surface generally parallel to and spaced apart from a plane defined by rotation of the knives, a leading edge, and a first access channel in the upper surface having a depth which increases the spacing to the plane of the rotating knives, the first access channel aligned on a first radial axis from the respective upstanding axis,
   each rock guard further comprising a second access channel similarly configured to the first access channel but rotationally offset to a second radial axis oriented such that one half of the knives on the cutterbar may be simultaneously aligned with the respective first access channels or second access channels on the plurality of rock guards.

2. The rock guard of claim 1, wherein the spacing between the upper surface and the plane of the rotating knives is insufficient to permit removal of the knives and the first and second access channels have a floor surface that is spaced to the plane of the rotating knives to enable each knife to be removed by downward motion from the rotating disc to a position at which the knife may be removed along the radial axis.

3. The rock guard of claim 2, wherein the first radial axis is rotationally offset approximately 45 degrees from the forward direction.

4. The rock guard of claim 1, wherein the second radial axis is rotationally 45 degrees from the forward direction and 90 degrees from the first radial axis.

5. A rock guard for rotary disc cutters used on an agricultural cutterbar for severing a standing crop from the ground while being propelled in a forward direction, the rock guard comprising:
   a plurality of rotary disc cutters configured for synchronized rotation about a plurality of spaced apart generally upstanding rotational axes, each cutter having a rotating disc;
   a pair of knives removably mounted on each of the plurality of rotating discs, the pair of knives mounted in diametric opposition defining a knife axis therebetween, respective knife axes on adjacent rotary discs being rotationally offset by a stagger angle;
   a pair of quick connectors attached to each rotary disc for removably mounting the respective pair of knives to each rotary disc, each quick connector allowing selective removal of the respective knife by downward movement parallel to the rotational axis to disengage the knife from the quick connector; and
   a rock guard disposed adjacently beneath each of the plurality of rotary disc cutters, the rock guard having an upper surface generally parallel to and spaced apart from a plane defined by rotation of the respective pairs of knives, spacing between the upper surface and the plane of knife rotation being insufficient to permit knife removal, the rock guard further having a leading edge and a first access channel in the upper surface having a depth spaced to the plane of the rotating knives which allows knife removal, the first access channel aligned on a first radial axis from the rotational axis,
   each rock guard further comprising a second access channel similarly configured to the first access channel but rotationally offset to a second radial axis oriented such that one half of the knives on the cutterbar may be simultaneously aligned with the respective first access channels or second access channels on the plurality of rock guards.

6. The rock guard of claim 5, wherein the stagger angle is approximately 90 degrees.

7. The rock guard of claim 6, wherein the first radial axis is rotationally offset approximately 45 degrees from the forward direction.

8. The rock guard of claim 5, wherein the second radial axis is rotationally 45 degrees from the forward direction and 90 degrees from the first radial axis.

* * * * *